March 11, 1952  M. W. MARIEN  2,589,107
PISTON PACKING RING
Filed June 19, 1950

INVENTOR:
MELVIN W. MARIEN
BY Harry A. Beimes
ATTORNEY.

Patented Mar. 11, 1952

2,589,107

UNITED STATES PATENT OFFICE 2,589,107

PISTON PACKING RING

Melvin W. Marien, St. Louis, Mo., assignor, by mesne assignments, to Ramsey Corporation, a corporation of Ohio Application June 19, 1950, Serial No. 168,911

2 Claims. (Cl. 309—44)

My invention has relation to improvements in piston packing rings for internal combustion engines and it consists in the novel features of construction more fully set forth in the specification and pointed out in the claims.

The invention is directed primarily to piston rings for replacement purposes in worn cylinders which are not reconditioned by grinding or boring.

It is a matter of common knowledge that after a long period of use cylinders become so highly polished that they are, in effect, glazed. This glassy surface prevents the breaking in of new rings as they slide freely over the glazed surface with insufficient friction to produce abrasion. I have sought to overcome this difficulty by forming an abrading surface on the cylinder contacting face of the ring that will act on the cylinder in the nature of a file to cut through the glazing and expose a new cylinder surface similar in physical characteristics to that of a new cylinder.

It is, therefore, the principal object of the invention to provide a piston ring having an abrading surface capable of attacking the glazed cylinder wall to permit mutual initial wear of cylinder and ring whereby the latter becomes seated to function effectively as a packing for both compression and oil.

Figure 1:
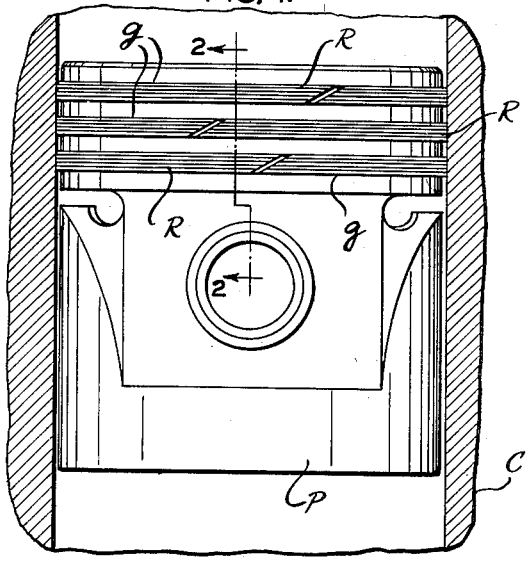
Figure 2:
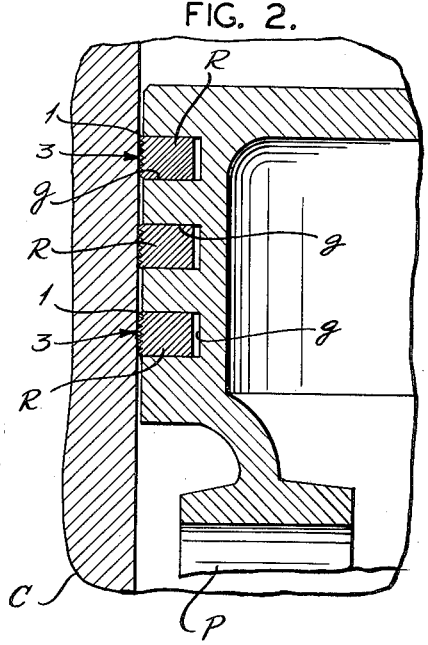
Figure 3:
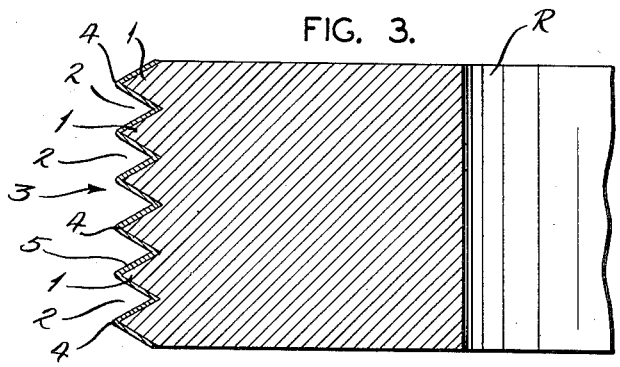
Figure 5:
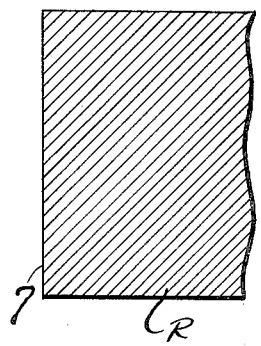
Figure 4:
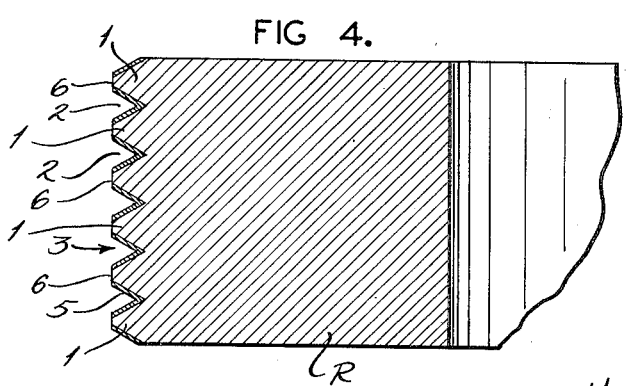

This object, as well as other advantages inherent in the invention, will be better apparent from a detailed description of the invention in connection with the accompanying drawings, in which:

Fig. 1 is a side elevation of a conventional piston equipped with my improved piston rings, a part of the engine cylinder being shown in section; Fig. 2 is an enlarged cross-sectional detail taken on the line 2—2 of Fig. 1; Fig. 3 is a greatly enlarged cross-section through my improved ring in its original condition before use; Fig. 4 is a similar cross-section through the ring after being used for a sufficient period of time to become "seated" in the cylinder or broken in; and Fig. 5 is a cross-section showing the final operating condition of the ring.

Referring to the drawings, P represents a piston operable in an engine cylinder C and equipped with a plurality of piston rings R, R, R embodying the features of my invention. Each ring is disposed in a ring groove g according to standard practice.

My improved ring R is preferably made of cast iron and has a series of connecting V-shaped ridges 1, 1, 1 etc. and V-shaped channels 2, 2, 2, formed in parallelism over its entire peripheral surface 3. These formations are comparatively small, approximating .01" in both width and depth, and may be likened to the scoring of a file as they present sharp circumferential edges 4, 4, 4 etc. outwardly. In order that these edges may be harder than the glazed surface of the cylinder C, the entire surface 3 of ring R is electroplated with a layer 5 of chromium. Thus when the ring R is inserted into the cylinder C the sharp, hard edges 4 bear against the cylinder wall under the inherent radial pressure built into the ring, and as the piston P moves back and forth the ring acts as a file to abrade the glazed cylinder surface and slightly roughen the same. Of course, the sharp edges 4 are worn down in this abrading action until the edges 4 are squared off as shown by the flat surfaces 6, 6, 6, etc. in Fig. 4. When the edges are thus worn flat the chromium layer 5 will have been removed therefrom and the cast iron of which the ring is made comes into contact with the cylinder wall. We then have the cast iron surfaces 6 in contact with the reconditioned cylinder wall, and the rings are broken in. However, the surfaces 6 continue to wear until the ridges 1 are entirely removed as shown in Fig. 5 at which time the ring R is seated over its entire surface 7 against the cylinder wall. This is the final operating condition of the ring and the wear proceeds in the same manner as with any ordinary plain surface ring.

Having described my invention, I claim:

1. A piston ring fabricated of a ferrous metal having a plurality of juxtaposed ridges formed on its cylinder contacting surface, said ridges being disposed circumferentially and presenting relatively sharp edges outwardly from said surface, and a non-ferrous coating of microscopic thickness over the entire surface, said coating being higher in the scale of hardness than the ring metal.

2. A piston ring fabricated of a ferrous metal and having its cylinder contacting surface covered with a plurality of parallel V-shaped ridges, and said surface being coated with a metal harder than that of the ring, said coated ridges being effective as an abrading medium on the cylinder, and said coating being of such thinness as to wear off during the abrading action.

MELVIN W. MARIEN.

REFERENCES CITED

The following references are of record in the file of this patent:

UNITED STATES PATENTS

| Number | Name | Date |
|---|---|---|
| 2,182,527 | Sargent, Jr. | Dec. 5, 1939 |
| 2,187,755 | Ryder | Jan. 23, 1940 |
| 2,248,530 | Granger et al. | July 8, 1941 |

FOREIGN PATENTS

| Number | Country | Date |
|---|---|---|
| 218,164 | Switzerland | of 1942 |